United States Patent
Bergerson et al.

(10) Patent No.: US 6,983,955 B2
(45) Date of Patent: Jan. 10, 2006

(54) AIR BAG INFLATORS

(75) Inventors: Lee D. Bergerson, Fountain Valley, CA (US); Ivan L. Stonich, Hermosa Beach, CA (US); Douglas P. Campbell, Metamora, MI (US); Brian R. Pitstick, Mesa, AZ (US); Paul A. Bowers, Ray, MI (US); Ernst M. Faigle, Dryden, MI (US)

(73) Assignees: TRW Inc., Lyndhurst, OH (US); TRW Vehicle Safety Systems Inc., Lyndhurst, OH (US)

( * ) Notice: Subject to any disclaimer, the term of this patent is extended or adjusted under 35 U.S.C. 154(b) by 16 days.

(21) Appl. No.: 09/755,704

(22) Filed: Jan. 5, 2001

(65) Prior Publication Data

US 2003/0006594 A1 Jan. 9, 2003

(51) Int. Cl.
*B60R 21/26* (2006.01)
*B60R 21/32* (2006.01)

(52) U.S. Cl. .................. 280/736; 280/735; 280/741; 280/742

(58) Field of Classification Search .............. 280/735, 280/736, 741, 742
See application file for complete search history.

(56) References Cited

U.S. PATENT DOCUMENTS

| | | | |
|---|---|---|---|
| 2,911,504 A | | 11/1959 | Cohn |
| 3,503,814 A | | 3/1970 | Helms, Jr. et al. |
| 3,724,870 A | | 4/1973 | Kurokawa et al. |
| 4,928,991 A | * | 5/1990 | Thorn ..................... 280/742 |
| 5,167,426 A | | 12/1992 | Mihm et al. |
| 5,400,487 A | * | 3/1995 | Gioutsos et al. ............ 280/735 |
| 5,404,263 A | * | 4/1995 | Graves et al. .............. 180/282 |
| 5,460,405 A | * | 10/1995 | Faigle et al. .............. 280/735 |
| 5,692,776 A | * | 12/1997 | Rink et al. ................ 280/741 |
| 5,880,921 A | | 3/1999 | Tham et al. |
| 5,984,350 A | | 11/1999 | Hagan et al. |
| 6,000,287 A | | 12/1999 | Menzel |
| 6,028,343 A | | 2/2000 | Chan et al. |
| 6,149,190 A | * | 11/2000 | Galvin et al. .............. 280/735 |
| 6,431,594 B1 | | 8/2002 | Swann et al. |

FOREIGN PATENT DOCUMENTS

| | | |
|---|---|---|
| DE | 2107859 | 9/1971 |
| EP | 0689969 | 1/1996 |
| EP | 0903487 | 7/1998 |

OTHER PUBLICATIONS

MEMS "Virtual Learning Cybercenter and E(du)–Pages", "So What are these MEMS?"; "MEMS Overview from MCNC".
"MEMS, Microengineering and Aerospace Systems", S. W. Janson and H. Helvajian, Center for Microtechnology, The Aerospace Corporation, Los Angeles, CA; K. Breuer, Aero/Astro Department, MIT, Cambridge, MA.
Article, D. Lewis, et al., entitled "Digital Micropulsion", Sensors and Actuators A; Physical, vol. 80, No. 2, Elsevier, Mar., 2000, p. 143,154.
U.S. Appl. No. 09/756,409, filed Jan. 8, 2001; entitled Seat Belt Webbing Pretensioner Using MEMS Devices.
U.S. Appl. No. 09/818,129, filed Mar. 27, 2001; entitled Air Bag Inflators.
U.S. Appl. No. 09/843,546, filed Apr. 26, 2001 entitled Initiators for Air Bag Inflators.
U.S. Appl. No. 09/933,926, filed Aug. 21, 2001 entitled Inflatable Seat Belt using MEMS Device.

* cited by examiner

*Primary Examiner*—Eric Culbreth
(74) *Attorney, Agent, or Firm*—Tarolli, Sundheim, Covell & Tummino L.L.P.

(57) ABSTRACT

An apparatus (10) for helping to protect a vehicle occupant includes an actuatable vehicle occupant protection device (12), and a microelectromechanical (MEMS) device (20) energizable to cause actuation of the protection device. In one embodiment, the MEMS device (20) is an energizable fluid source for emitting a primary fluid for actuating an inflatable protection device (12). The apparatus (10) may comprise a plurality of MEMS devices (20) individually actuatable to control inflation of the protection device.

40 Claims, 4 Drawing Sheets

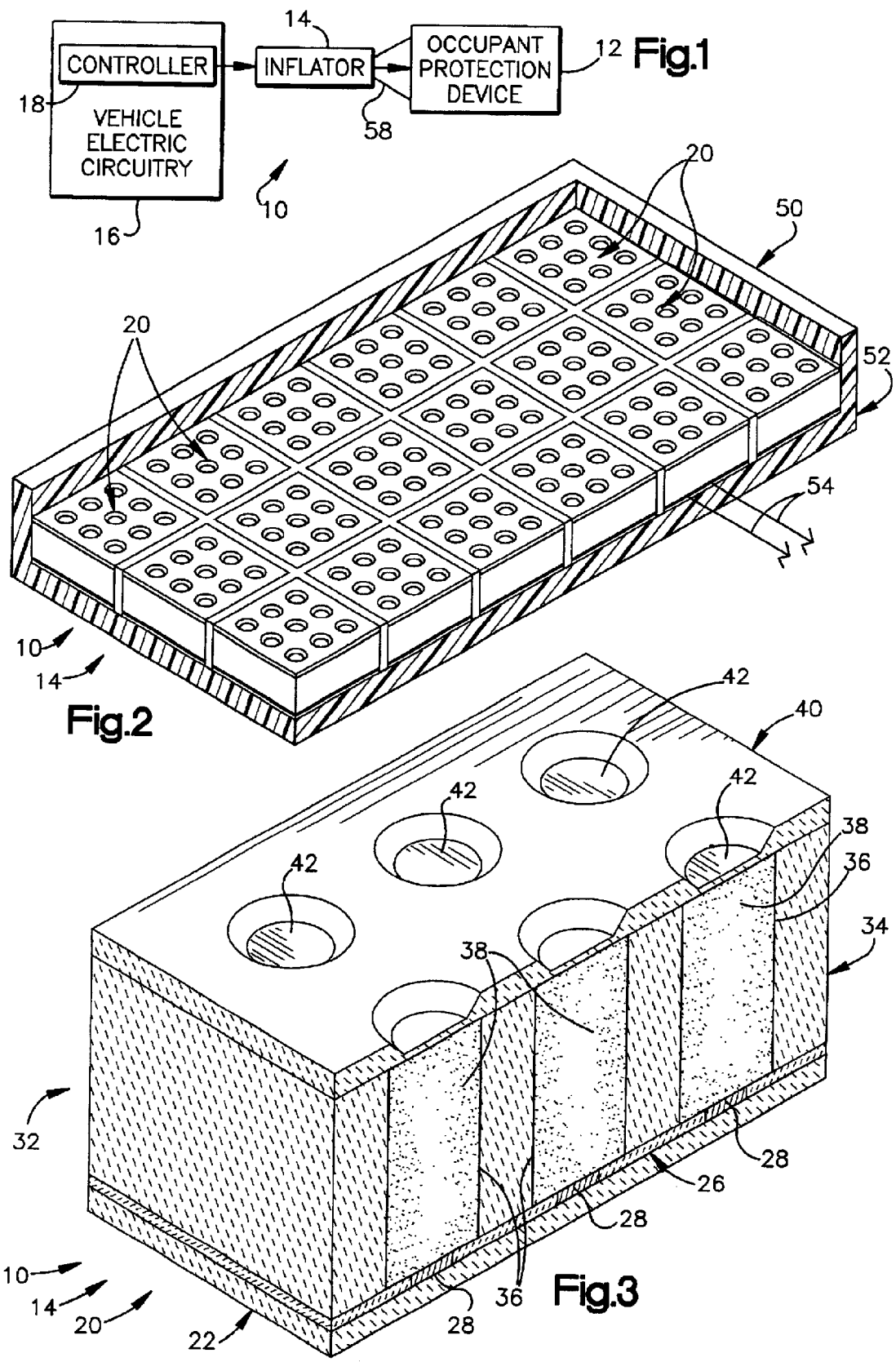

AIR BAG INFLATORS

BACKGROUND OF THE INVENTION

1. Technical Field

The present invention relates to a vehicle occupant protection apparatus and, in particular, to a vehicle occupant protection device that is actuated by fluid under pressure.

2. Description of the Prior Art

European Patent Application EP 0 903 487 A2 describes an integrated pulsed propulsion system for a microsatellite and, in particular, a microthruster for a microsatellite. The microthruster is formed with a chamber closed by a diaphragm, which acts as a blow-out disk. A fluid, such as an inert gas, is disposed within the chamber. Heating of the gas causes the gas pressure to increase until the diaphragm ruptures, which, in turn, causes the gas to flow out of the chamber. The flowing gas acts as a propellant, and provides a small unit of force. The microthruster is adapted to be formed by known batch processing methods with 104 to 106 microthrusters per wafer. The unit of force can be scaled by varying the number of microthrusters used for an application, the geometry of the chamber, and the type of fluid used within the chamber.

The microthruster described in EP 0 903 487 A2 is described elsewhere in the literature as consisting of a 3-layer sandwich. The top layer contains an array of thin diaphragms (0.5 micron thick silicon nitride, 190 or 290 or 390 microns square). The middle layer contains an array of through-holes (Schott FOTURAN® photosensitive glass, 1.5 mm thick, 300, 500, or 700 micron diameter holes), which are loaded with propellant. The bottom layer contains a matching array of polysilicon micro-resistors. The bottom two layers are bonded together, then fueled, then the top layer is bonded to complete the assembly. With different sizes of plenum holes, diaphragms, and resistors, many different configurations can be assembled.

This type of microthruster is one type of device known in the art as a "microelectromechanical system device", or "MEMS device". This type of device is known for use in a variety of applications. For example, U.S. Pat. No. 5,880,921 discloses a monolithically integrated switched capacitor bank using MEMS technology.

SUMMARY OF THE INVENTION

The present invention is an apparatus for helping to protect a vehicle occupant. The apparatus comprises an actuatable vehicle occupant protection device, and a microelectromechanical system (MEMS) device energizable to cause actuation of the protection device.

In one embodiment, the MEMS device is an energizable fluid source for emitting a primary fluid for actuating an inflatable protection device. The apparatus may comprise a plurality of MEMS devices individually actuatable to control inflation of the protection device.

In another embodiment of the invention, the apparatus comprises an array of individually energizable devices for emitting either inflation fluid or combustion products for actuating the protection device, and means for energizing selected ones of the array of individually energizable devices. The means for energizing comprises a base extending across the array including a substrate on which are formed a plurality of electric heating elements associated one with each of the energizable devices. The means for energizing further comprises control means for directing electric current into selected ones of the plurality of electric heating elements to energize the selected ones of the energizable devices.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a block diagram view of an apparatus for helping to protect a vehicle occupant, constructed in accordance with a first embodiment of the present invention;

FIG. 2 is a partial perspective view of an inflator that forms part of the apparatus of FIG. 1;

FIG. 3 is an enlarged sectional view of one MEMS device that forms part of the inflator of FIG. 2;

DETAILED DESCRIPTION OF EMBODIMENTS OF THE INVENTION

Figure 4:
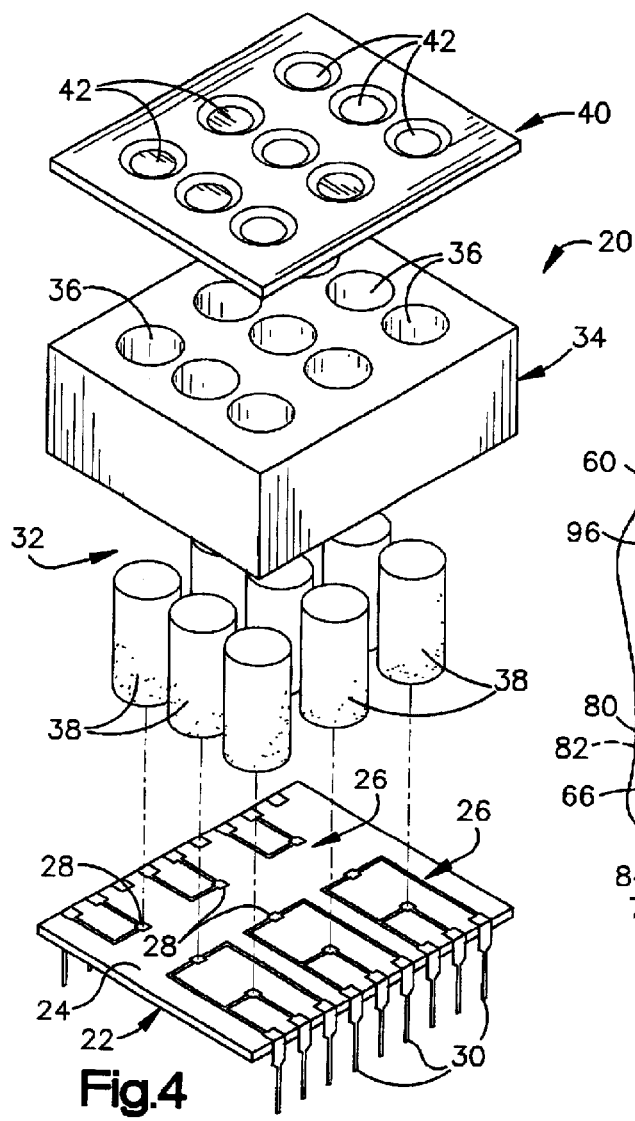
FIG. 4 is an exploded perspective view of the MEMS device of FIG. 3.

The present invention relates to a vehicle occupant protection apparatus. As representative of the present invention, FIG. 1 illustrates schematically an apparatus 10 for helping to protect a vehicle occupant. The apparatus 10 includes a particular actuatable vehicle occupant protection device in the form of an air bag 12. Other actuatable vehicle occupant protection devices that can be used in accordance with the invention include, for example, inflatable seat belts, inflatable knee bolsters, inflatable head liners, inflatable side curtains, knee bolsters actuated by air bags, and seat belt pretensioners.

The air bag 12 is preferably made from a flexible fabric material, such as woven nylon. The air bag 12 can alternatively be made from a non-woven material, such as plastic film. The use of plastic film, in particular, would require one or more inflation fluid vents to be formed in the air bag 12, as is known in the art.

The apparatus 10 also includes an inflator 14, described below in detail, for actuating the device 12. The apparatus 10 further includes vehicle electric circuitry 16 for energizing the inflator 14 when it is desired to help protect the vehicle occupant by actuating the device 12. The vehicle electric circuitry 16 includes a controller 18.

The controller 18 preferably includes one or more microprocessors for controlling operation of the inflator 14. The controller 18 may, for example, be a plurality of discrete components and/or a combination of discrete components and integrated circuits. In one example, the controller 18 is a microcomputer that receives sensory input from one or more sources, such as occupant condition sensors and vehicle condition sensors, and, using the sensory input, makes determinations for control of the inflator 14.

The inflator 14 is illustrated schematically in more detail in FIGS. 2–4. The inflator 14 includes a plurality of microelectromechanical system (MEMS) devices 20. Each one of the MEMS devices 20 is configured as shown in FIG. 4. Each one of the MEMS devices 20 is a multi-layered device that may be manufactured in a manner similar to that described in European Patent Application EP 0 903 487 A2, and in the article D. Lewis, et al., "Digital Micropropulsion", *Sensors and Actuators A: Physical*, Vol. 80, No. 2, Elsevier, March, 2000, p. 143–154.

Each MEMS device 20 includes a bottom layer or base 22. The base 22 is made from a rectangular block of material the upper surface 24 of which includes electric circuitry 26. The electric circuitry 26 includes a plurality of individually energizable electric heating elements 28 connected with terminal pins 30. In the illustrated embodiment, the electric circuitry 26 includes nine individually energizable electric heating elements 28 connected with nine terminal pins 30 The nine heating elements 28 are spaced apart in a rectangular 3×3 array on the base 22.

The base 22 may be made using standard complementary metal oxide semiconductor (CMOS) processes. The base 22 may be made from silicon or other suitable material. The base 22 may be made from silicon or other suitable material, such a polyimide or ceramic.

The heating elements 28 may be polysilicon resistors or other micro-resistors. The heating elements may also be reactive bridges, as described below. The electric circuitry on the base 22 may include address and control electronics.

The MEMS device 20 also includes a middle layer 32 formed on the base 22. The middle layer 32 includes a propellant block 34. The propellant block 34 defines a series of cylindrical plenums or propellant chambers 36. In the illustrated embodiment, the propellant block 34 includes nine propellant chambers 36. The nine propellant chambers 36 are spaced apart in the propellant block 34 in the same rectangular 3×3 array as the nine heating elements 28 on the base 22. The heating elements 28 are associated in a one-to-one relationship with the propellant chambers 36 for, when energized, heating the contents of the propellant chambers.

One suitable material for the propellant block 34 is hard anodized aluminum. Another suitable material is Foturan brand photosensitive glass. Foturan is a registered trademark of Schott Glaswerke of Mainz, Germany for its products made of glass or glass ceramic materials. These materials can be used to make very fine structures with tight tolerances and high aspect ratios (hole depth to hole width).

The middle layer 32 of the MEMS device 20 also includes, in each one of the chambers 36, contents that are heatable to increase the pressure in the chamber. In the illustrated embodiment, the contents of the chambers 36 are bodies 38 of a solid propellant material, or pyrotechnic material, which is actuatable, or ignitable, upon the application of heat, to produce fluid under pressure. Each propellant body 38 has a cylindrical configuration and fills a respective one of the propellant chambers 36.

One suitable material for the propellant bodies 38 is zirconium potassium perchlorate, which is commonly used in igniters for air bag inflators. Another suitable material is potassium dinitrobenzofuroxan (KDNBF).

The MEMS device 20 also includes a top layer or outer layer 40 having a plurality of individually rupturable segments or diaphragms 42, which serve as burst disks. The diaphragms 42 are thin-walled portions of the outer layer 40. In the illustrated embodiment, the outer layer 40 includes nine individual diaphragms 42. The nine diaphragms 42 are spaced apart in the outer layer 40 in the same rectangular 3×3 array as the nine propellant chambers 36 and the nine heating elements 28.

The outer layer 40 may be made from silicon nitride. The diaphragms 42 may be thin silicon nitride remaining after an anisotropic wet etch through a silicon wafer. Other suitable materials include ceramics, such as silicon carbide, and metals. The outer layer 40 may also be made from aluminum tape or Kapton brand tape. The three layers 22, 32 and 40 may be bonded together by any suitable method, such as with a high performance adhesive tape or an aerospace grade RTV adhesive.

The individual diaphragms 42 of the outer layer 40 are associated in a one-to-one relationship with the individual propellant chambers 36. Each diaphragm 42 closes a respective propellant chamber 36. Each one of the diaphragms 42 is rupturable due to an increase in pressure in its associated chamber 36 to enable flow of fluid out of the chamber.

The individual MEMS devices 20 are mounted in an array as illustrated in FIG. 2 to form the inflator 14. Specifically, the MEMS devices 20 are mounted in a housing shown partially at 50. The housing 50 has a base 52. The inflator base 52 has a pair of lead wires 54, which are electrically connected with pin mounting openings (not shown) in the base 52 for receiving the terminal pins 30 of all of the MEMS devices 20.

The terminal pins 30 of each MEMS device 20 engage in pin mounting openings of the housing base 52 to connect the MEMS devices electrically with the lead wires 54. The lead wires 54 are electrically connected with the vehicle electric circuitry 16.

In the event of a vehicle collision or other event for which protection of the vehicle occupant is desired, the vehicle electric circuitry 16 sends an actuation signal over the lead wires 54 to the inflator 14. The vehicle electric circuitry 16 is operable to provide an actuation signal for energizing any selected one or more of the MEMS devices 20 in the inflator 14, at a selected time. In addition, the vehicle electric circuitry 16 is operable to provide an actuation signal for energizing any selected one or more of the heating elements 28 within each one of the MEMS devices 20, at a selected time. Thus, the inflator 14 is effectively "digital" in construction and operation, that is, comprising a very large number of discrete, individually actuatable inflation fluid sources.

When an individual heating element 28 of one of the MEMS devices 20 is energized, it generates heat, which is transmitted into the associated propellant body 38. The propellant body 38 ignites and generates a primary fluid under pressure in the associated propellant chamber 36. The increased pressure in the propellant chamber 36 causes the associated diaphragm 42 of the top layer 40 to rupture, which enables the primary fluid to flow out of the chamber.

The primary fluid is directed, by a reaction canister or other device shown schematically at 58 (FIG. 1), to the occupant protection device 12. In the illustrated embodiment, the occupant protection device 12 is an air bag, and the air bag is inflated by the primary fluid flowing from the inflator 14. The apparatus 10 could include a device other than a reaction canister for directing the primary fluid to the occupant protection device 12. For example, the apparatus 10 could be a seat mounted air bag module with a diffuser that directs inflation fluid into an air bag, or a side curtain assembly including a fill tube that directs inflation fluid into an inflatable side curtain. Alternatively, the apparatus 10 could be a driver side air bag module including a housing for a plurality of MEMS devices, the housing having inflation fluid outlets that direct inflation fluid into an inflatable driver side air bag.

The fluid output of the inflator 14 is dependent on, and varies with, the number of MEMS devices 20 that are energized, the number of propellant bodies 38 that are ignited, and the time at which each individual propellant body is ignited. The output is also dependent on the volume of each propellant chamber 36, and the type and amount of propellant 38 disposed in the propellant chambers.

In the microthruster application described in European Patent Application EP 0 903 487 A2, each plenum or propellant chamber is about 1.5 mm tall (axial length) and up to about 0.7 mm in diameter. When MEMS devices of this type serve as a primary fluid source, as in the embodiment of FIGS. 1–4, for a vehicle occupant protection device such as an air bag, the depth of each plenum chamber can be increased to up to 10 mm or more, and the diameter of each plenum can be increased by at least a factor of two. Also, a tapered chamber may be used, rather than a cylindrical chamber. Increasing both the diameter and the depth of a plenum chamber can increase the volume of the plenum by a factor of 12. A MEMS device for use in the inflator 14, having an array of from three to fifteen plenums, may be about one half inch square (in length and width). A plurality of individual actuatable devices of this size can provide an inflator having fluid output sufficient to inflate an air bag or other inflatable vehicle occupant protection device.

An inflator 14 in accordance with this embodiment of the invention can include a vast number of propellant bodies 38, thus enabling a substantial range of tailoring of the fluid output of the inflator 14. The vehicle electric circuitry 16 can control the rate of fluid output of the inflator 14 over a period of time, by selectively causing the ignition of any one or more of a plurality of propellant bodies 38 over a selected period of time. The controller 18 is operative, in a known manner, to actuate the propellant bodies 38 all at once or in any controlled sequence depending on information about the vehicle event and occupant information received from appropriate sensors forming part of the vehicle electric circuitry 16.

Figure 5:
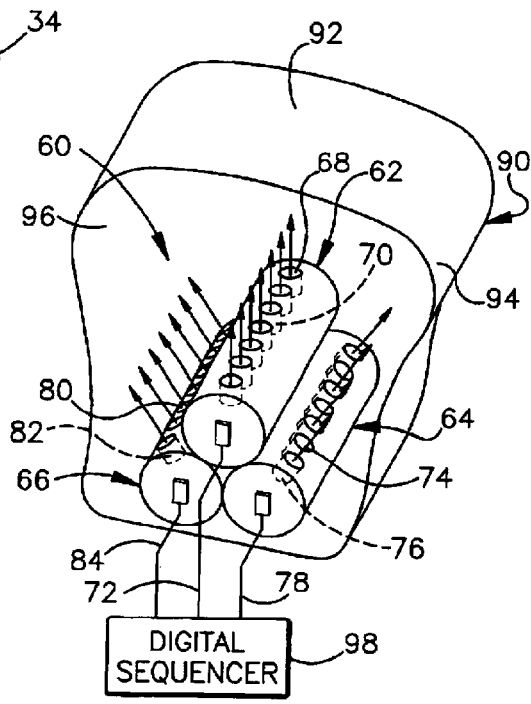
FIG. 5 is a schematic illustration of an apparatus for helping to protect a vehicle occupant, constructed in accordance with a second embodiment of the present invention.

FIG. 5 illustrates schematically an inflator 60 constructed in accordance with a second embodiment of the invention. The inflator 60 includes a plurality of inflator sections. In the illustrated embodiment, three inflator sections 62, 64 and 66 are provided. The inflator sections 62, 64 and 66 include MEMS devices that are of the type described above with reference to FIGS. 1–4.

The inflator section 62 includes a plurality of inflation fluid outlets 68 arranged in a linear array. The inflator section 62 includes a plurality of individually energizable MEMS devices 70. The output of each one of the MEMS devices 70 is directed through an individual one of the inflation fluid outlets 68. The inflator section 62 is energizable via lead wires indicated schematically at 72.

The inflator section 64 includes a plurality of inflation fluid outlets 74 arranged in a linear array. The inflator section 64 includes a plurality of individually energizable MEMS devices 76. The output of each one of the MEMS devices 76 is directed through an individual one of the inflation fluid outlets 74. The inflator section 64 is energizable via lead wires indicated schematically at 78.

The inflator section 66 includes a plurality of inflation fluid outlets 80 arranged in a linear array. The inflator section 66 includes a plurality of individually energizable MEMS devices 82. The output of each one of the MEMS devices 82 is directed through an individual one of the inflation fluid outlets 80. The inflator section 66 is energizable via lead wires indicated schematically at 84.

The inflator sections 62–66 are mounted within an air bag indicated schematically at 90. The inflator sections 62–66 are oriented differently from each other within the air bag 90. Specifically, the inflator section 62 is oriented so that its inflation fluid outlets 68 are pointed toward a central portion 92 of the air bag 90. The inflator section 64 is oriented so that its inflation fluid outlets 74 are pointed toward a first side portion 94 of the air bag 90. The inflator section 66 is oriented so that its inflation fluid outlets 80 are pointed toward a second side portion 96 of the air bag 90, opposite the first side portion 94.

The lead wires 72, 78 and 84 of the three inflator sections 62–66 are connected with a digital sequencer 98. The digital sequencer 98 is operative to energize selectively the inflator sections 62–66 and, within each inflator section, the individual MEMS devices 70, 76 and 82, respectively.

Thus, if it is desired that the air bag 90 be inflated primarily to one side rather than to the other side, for example, to help protect an out of position vehicle occupant, the digital sequencer 98 can energize the first and second inflator sections 62 and 64. The inflation fluid from the first inflator section 62 is directed toward the central portion 92 of the air bag 90 and acts primarily to inflate the central portion of the air bag. The inflation fluid from the second inflator section 64 is directed toward the first side portion 94 of the air bag 90 and acts primarily to inflate the first side portion of the air bag. The third inflator section 66 is not energized. The second side portion 96 of the air bag 90 is not inflated by inflation fluid directed toward the second side portion, but rather by inflation fluid directed toward other portions of the air bag.

It is possible to use a fluid rather than a solid propellant in MEMS devices for actuating a vehicle occupant protection device. The fluid may directly replace the solid propellant bodies. Alternatively, to avoid making a complex housing having numerous welds to contain fluid under pressure, such a MEMS device may include a plurality of individual containers of fluid under pressure, inserted into a single housing.

Figure 6:
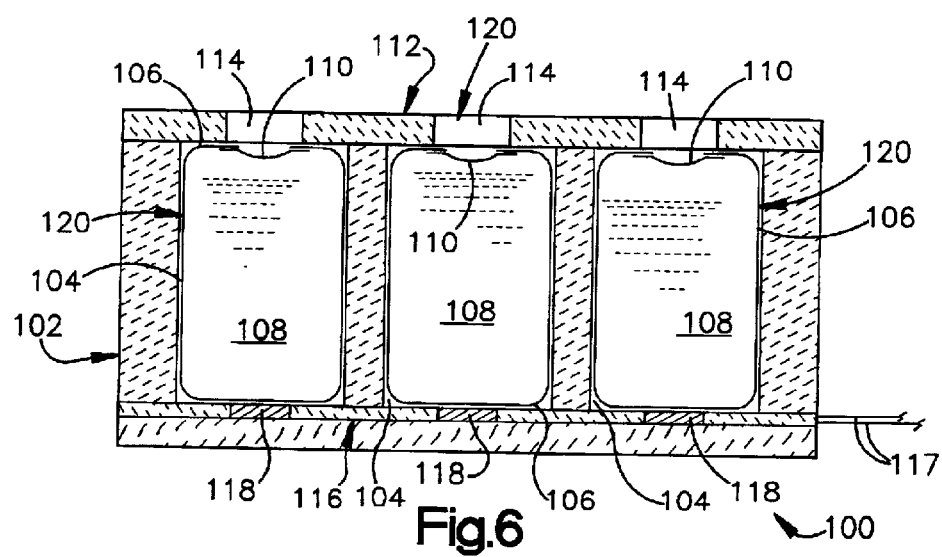
FIG. 6 is a schematic sectional view of an apparatus for helping to protect a vehicle occupant, constructed in accordance with a third embodiment of the present invention.

As an example, FIG. 6 illustrates schematically an inflator 100 constructed in accordance with a third embodiment of the invention. The inflator 100 includes a housing 102, which defines three chambers 104. In each chamber 104 is located a container 106.

Each container 106 contains a fluid 108, which may or may not be under pressure. The container 106 is sealed by a rupturable wall portion 110, such as a burst disk. A manifold 112 extends across the top of the housing 102. The manifold 112 has a plurality of fluid outlets 114, which are aligned in a one-to-one relationship with the rupturable wall portions 110 of the containers 106.

The inflator 100 includes a base 116, which has lead wires 117 electrically connected with a plurality of heating elements 118. The heating elements 118 are associated in a one-to-one relationship with the containers 106. Each individual combination of a heating element 118 and a container 106 forms a MEMS device 120. The lead wires 117 are also electrically connected with vehicle electric circuitry, such as the circuitry 16 (FIG. 1).

In the event of a vehicle collision or other event for which protection of the vehicle occupant is desired, the vehicle electric circuitry sends an actuation signal over the lead wires 117 to the inflator 100. The vehicle electric circuitry is operable to provide an actuation signal for energizing any selected one or more of the MEMS devices 120.

When an individual MEMS device 120 is energized, its heating element 118 generates heat, which is transmitted into the associated container 106. The fluid 108 in the container 106 is heated and increases in pressure. The increased pressure causes the associated rupturable wall portion 110 of the container 106 layer to rupture, which enables the fluid 108 to flow out of the container.

The fluid 108 is directed, by the fluid outlets 114, to the occupant protection device. The fluid output of the inflator 100 is dependent on, and varies with, the number of MEMS devices 120 that are energized, and the time of actuation of each individual device. Therefore, the vehicle electric circuitry 16 can control the fluid output of the inflator 100, both in time and duration, by selectively energizing any one or more of a plurality of the MEMS devices 120 over a selected period of time.

Figure 7:
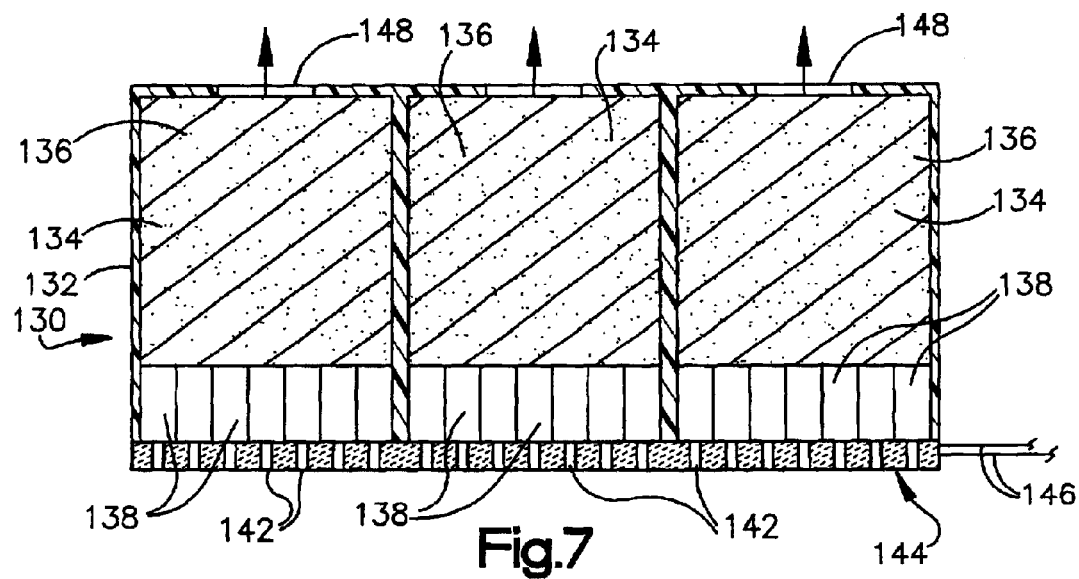
FIG. 7 is a schematic sectional view of an apparatus for helping to protect a vehicle occupant, constructed in accordance with a fourth embodiment of the present invention.

FIG. 7 illustrates schematically an inflator 130 constructed in accordance with a fourth embodiment of the invention. In the inflator 130, MEMS devices function as initiators rather than as primary fluid sources. Specifically, the inflator 130 includes a housing 132 that defines a plurality of chambers. In the illustrated embodiment, the housing 132 defines three chambers 134. In each chamber 134 is located a main pyrotechnic charge 136. The pyrotechnic charge 136 is ignitable by heat to produce inflation fluid under pressure.

A plurality of MEMS devices 138 are associated with each one of the chambers 134. In the illustrated embodiment, there are seven MEMS devices 138 associated with each one of the chambers 134. Each one of the MEMS devices 138 includes heatable contents in the form of a solid propellant material, which, when heated, ignites to produce hot combustion products. Each one of the MEMS devices 138 also includes an electric heating element 142.

The heating elements 142 for all three chambers 134 of the inflator 130 are formed on a base 144. The base 144 may be manufactured in a manner similar to that of the base 22 (FIG. 3). Lead wires 146 extend from the base 144 and are electrically connected with vehicle electric circuitry, such as the circuitry 16.

In the event of a vehicle collision or other event for which protection of the vehicle occupant is desired, the vehicle electric circuitry sends an actuation signal over the lead wires 146 to the inflator 130. The vehicle electric circuitry is operable to provide an actuation signal for energizing any selected one or more of the MEMS devices 138.

The MEMS devices 138 are used to control the rate of combustion of the main pyrotechnic charges 136. When an individual MEMS device 138 is energized, its heating element 142 generates heat to ignite its solid propellant material. The combustion products of the solid propellant material contact the adjacent pyrotechnic charge 136, igniting it. The ignition of the material 136 produces inflation fluid under pressure, which is directed through an inflation fluid outlet 148 to actuate the associated occupant protection device.

The fluid output of the inflator 130 is dependent on, and varies with, the number of MEMS devices 138 that are energized, and the time of actuation of each individual device. For example, if only one MEMS device 138 in the entire inflator 130 is energized, then only one of the three pyrotechnic charges 136 is ignited. Also, the one pyrotechnic charge 136 that is ignited burns relatively slowly because it is ignited only at one location. The fluid output of the inflator is relatively low.

In contrast, if all the MEMS devices 138 for one of the three pyrotechnic charges 136 are ignited, that pyrotechnic charge burns relatively rapidly because it is ignited over a larger surface area. Further, if more than one of the pyrotechnic charges 136 is ignited by its associated MEMS devices 138, the fluid output of the inflator 130 will increase substantially.

In this manner, the vehicle electric circuitry 16 can control the fluid output of the inflator 130, both in time and duration, by selectively energizing any one or more of the MEMS devices 138 over a selected period of time. The MEMS devices are small enough that a large number of them may be used in the relatively small space typically occupied by one initiator.

Figure 8:
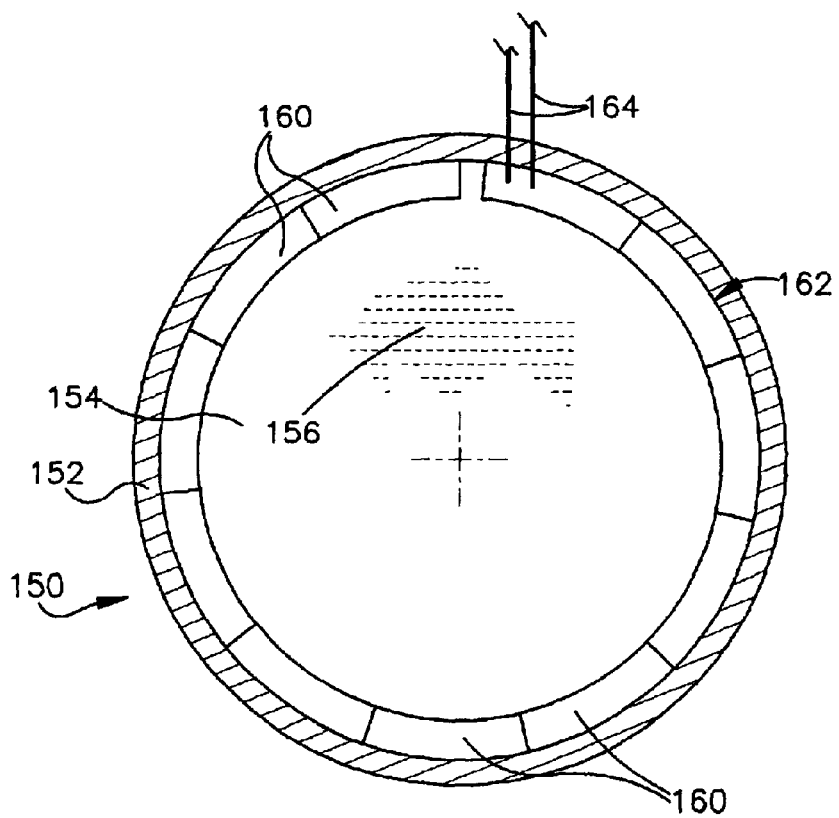
FIG. 8 is a schematic sectional view of an apparatus for helping to protect a vehicle occupant, constructed in accordance with a fifth embodiment of the present invention.

FIG. 8 illustrates schematically an inflator 150 constructed in accordance with a fifth embodiment of the invention. In the inflator 150, MEMS devices function as initiators for a heated gas inflator.

Specifically, the inflator 150 includes a housing 152 that defines a gas storage chamber 154. The gas storage chamber 154 contains a quantity of fluid 156 under pressure. The fluid 156 is a mixture of an inert gas, a fuel gas, and oxygen.

A plurality of MEMS devices 160 are located in the gas storage chamber 154. Each one of the MEMS devices 160 is electrically actuatable to generate combustion products, including heat, for igniting the fuel gas. The MEMS devices 160 are formed in a batch process as a flexible sheet material 162. The resulting product is rolled up and inserted into the gas storage chamber 154 of the inflator 150 before the chamber is filled with the fluid 156 and sealed. Lead wires 164 extend from the MEMS sheet 162 and are electrically connected with vehicle electric circuitry, such as the circuitry 16 (FIG. 1).

In the event of a vehicle collision or other event for which protection of the vehicle occupant is desired, the vehicle electric circuitry sends an actuation signal over the lead wires 164 to the inflator 150. The vehicle electric circuitry is operable to provide an actuation signal for energizing any selected one or more of the MEMS devices 160.

When an individual MEMS device 160 is energized, it generates hot combustion products to ignite the fuel gas component of the stored gas 156 in the gas storage chamber 154. The ignition of the fuel gas produces heat to increase the pressure of the inert gas that is present in the gas storage chamber 154. The resulting inflation fluid under pressure in the chamber 154 is directed through an inflation fluid outlet (not shown) to actuate an associated occupant protection device.

The fluid output of the inflator 150 is dependent on, and varies with, the number of MEMS devices 160 that are energized, and the time of actuation of each individual device. For example, if all the MEMS devices 160 are energized simultaneously, the fuel gas is ignited rapidly and the pressure in the gas storage chamber 154 rises rapidly. The inflator will then direct inflation fluid into an associated vehicle occupant protection device more quickly and at a higher flow rate. In comparison, if only one MEMS device 160 in the entire inflator 150 is energized, then the fuel gas is ignited and burns relatively slowly, and the fluid pressure in the gas storage chamber 154 rises relatively slowly. The inflator 150 will then direct inflation fluid into an associated vehicle occupant protection device at a later time and at a lower flow rate.

The vehicle electric circuitry 16 can control the fluid output of the inflator 150, both in time and duration, by selectively energizing any one or more of the MEMS devices 160 over a selected period of time. The MEMS devices 160 are small enough that a large number of them may be used in the space typically occupied by one initiator, and they may be placed where desired for optimum combustion of the fuel gas.

Figure 9:
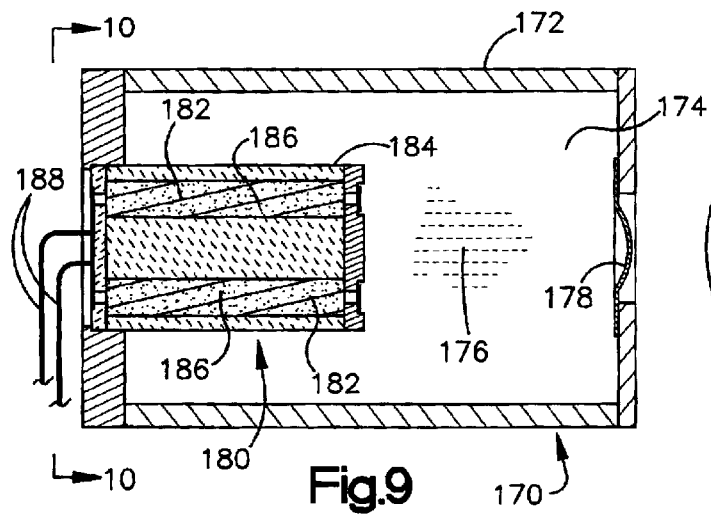
FIG. 9 is a schematic sectional view of an apparatus for helping to protect a vehicle occupant, constructed in accordance with a sixth embodiment of the present invention.
Figure 10:
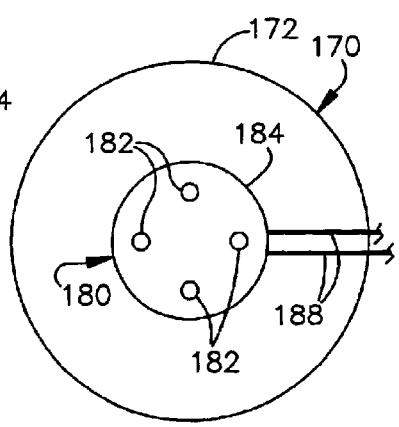
FIG. 10 is a schematic end view of the apparatus of FIG. 9, taken along line 10—10.

FIGS. 9 and 10 illustrate schematically an inflator 170 constructed in accordance with a sixth embodiment of the invention. The inflator 170 is an augment type inflator, which uses the combustion of a solid propellant material to increase the pressure of gas stored in a container.

The inflator 170 includes a housing 172, which defines a gas storage chamber 174. The gas storage chamber 174 contains a quantity of fluid 176 under pressure. The fluid 176 is preferably an inert gas, such as nitrogen. The housing 172 has a rupturable portion 178, such as a burst disk.

The inflator 170 includes an actuator assembly 180. The actuator assembly 180 comprises a plurality of MEMS devices 182 located in a housing 184 in the gas storage chamber 176. Each one of the MEMS devices 182 includes heatable contents, such as a solid propellant material 186, which is ignitable to generate combustion products, including heat. Lead wires 188 extend from the MEMS devices 182 and are electrically connected with vehicle electric circuitry, such as the circuitry 16 (FIG. 1).

In the event of a vehicle collision or other event for which protection of the vehicle occupant is desired, the vehicle electric circuitry sends an actuation signal over the lead wires 188 to the inflator 170. The vehicle electric circuitry is operable to provide an actuation signal for energizing any selected one or more of the MEMS devices 182 in the initiator assembly.

When one of the MEMS devices 182 is energized, its solid propellant material 186 is ignited and generates hot combustion products, which contact the fluid 176 in the gas storage chamber 174. The temperature of the fluid 176 in the gas storage chamber 174 is raised and, accordingly, its pressure. The burst disk 178 ruptures, enabling flow of inflation fluid 176 out of the gas storage chamber 174. The burning propellant material 186 of the MEMS device 182 also generates inflation fluid to increase directly the pressure in the gas storage chamber 174.

If more than one of the MEMS devices 182 is energized simultaneously, the pressure in the gas storage chamber 174 will increase to a greater pressure, enabling a more rapid flow of inflation fluid 176 out of the inflator 170. The associated vehicle occupant protection device will be inflated more quickly and at a higher flow rate. Also, if several of the MEMS devices 182 are energized at different times, the flow rate of inflation fluid 176 flowing from the inflator 170 can be varied over time. Thus, the vehicle electric circuitry 16 can control the time of rupturing of the burst disk 178, and the consequent fluid output of the inflator 170, both in time and duration, by selectively energizing any one or more of the MEMS devices 182 over a period of time.

Figure 11:
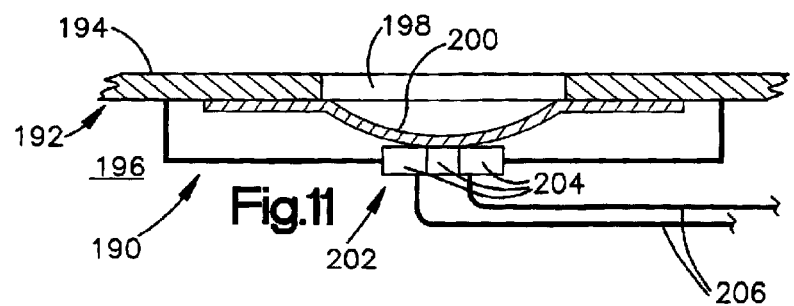
FIG. 11 is a schematic sectional view of an apparatus for helping to protect a vehicle occupant, constructed in accordance with a seventh embodiment of the present invention.

FIG. 11 illustrates schematically a portion of an inflator 190 constructed in accordance with a seventh embodiment of the invention. The inflator 190 includes a container 192 having a wall 194 and defining a gas storage chamber 196. The wall 194 has an inflation fluid outlet 198 through which inflation fluid stored under pressure in the gas storage chamber 196 can exit the inflator 190. The inflation fluid outlet 198 is closed by a burst disk 200.

The inflator 190 includes a MEMS assembly 202 for opening the burst disk 200. The MEMS assembly 202 includes one or more MEMS devices 204. In the illustrated embodiment, the MEMS assembly 202 includes three MEMS devices 204. The MEMS assembly 202 is connected by lead wires 206 with vehicle electric circuitry such as the circuitry 16 (FIG. 1).

In the event of a vehicle collision or other event for which protection a vehicle occupant is desired, the vehicle electric circuitry sends an actuation signal over the lead wires 206 to the inflator 190. The vehicle electric circuitry is operable to provide an actuation signal for energizing any selected one or more of the MEMS devices 204.

When any one of the MEMS devices 204 is energized, it generates combustion products and/or a shock wave, which are directed into contact with the burst disk 200. The burst disk 200 ruptures, enabling flow of inflation fluid out of the gas storage chamber 196 through the inflation fluid outlet 198. The inflation fluid is directed into an associated occupant protection device.

The MEMS devices are small enough that several may be used in conjunction with one relatively small burst disk. If more than one of the MEMS devices 204 is energized simultaneously, the burst disk 200 will open to a greater extent, enabling a more rapid flow of inflation fluid out of the inflator 190 through the inflation fluid outlet 198. The associated vehicle occupant protection device will be inflated more quickly and at a higher flow rate. Also, if several of the MEMS devices 204 are energized at different times, the opening of the burst disk 200 will occur over an extended period of time, to tailor the flow of inflation fluid out of the inflator 190 through the inflation fluid outlet 198. Thus, the vehicle electric circuitry 16 can control the rupturing of the burst disk 200, and the consequent fluid output of the inflator 190, both in time and duration, by selectively energizing any one or more of the MEMS devices 204 over a period of time.

The MEMS heating element may, alternatively, be a reactive bridge. A reactive bridge is a wire form bridge of bimetallic construction that yields thermal energy when energized electrically, principally by the release of alloy or intermetallic heat of formation from the chemically reacted metals. Reactive bridges are shown in U.S. Pat. Nos. 2,911,504 and 3,503,814, and are available commercially from Sigmund Cohn Corp., 121 South Columbus Avenue, mount Vernon, N.Y., Internet site www.sigmundcohn.com, under the brand name PYROFUZE®. When the two metallic elements of the reactive bridge are brought to the initiating temperature by flow of electric current, they alloy rapidly resulting in instant deflagration without support of oxygen.

One advantage of using a reactive bridge is that it generates and disperses so much heat that it need only be close to (and not in intimate contact with) the material that it is to ignite (such as solid propellant). A resistive heating element, on the other hand, must be maintained in intimate contact with the material being ignited. The reactive bridge can be deposited on the MEMS base layer by a number of different methods.

From the above description of the invention, those skilled in the art will perceive improvements, changes and modifications in the invention. Such improvements, changes and Having described the invention, we claim:

1. An apparatus comprising:
   an actuatable vehicle occupant protection device;
   at least one multi-layered device including:
   an outer layer having a plurality of individually rupturable segments;
   a middle layer having a plurality of individual chambers associated in a one-to-one relationship with said rupturable segments of said outer layer and being closed by said rupturable segments, each one of said chambers having contents heatable to increase the pressure in said chamber; and
   a base layer having a plurality of individually energizable electric heating elements associated in a one-to-one relationship with said chambers for, when energized, heating the contents of said chambers;
   each one of said rupturable segments being rupturable due to an increase in pressure in its associated chamber to enable flow of fluid out of said chamber; and
   means for selectively energizing said individually energizable electric heating elements.

2. An apparatus as set forth in claim 1 wherein said heatable contents comprises a pyrotechnic material which is ignitable to produce fluid under pressure.

3. An apparatus as set forth in claim 1 wherein said heatable contents comprises a fluid under pressure which is heatable to increase its pressure.

4. An apparatus as set forth in claim 1 wherein said electric heating elements are micro-resistors.

5. An apparatus as set forth in claim 1 wherein said protection device is an air bag.

6. An apparatus as set forth in claim 1 wherein said multi-layered device is an initiator for a fluid-generating apparatus.

7. An apparatus as set forth in claim 1, wherein said multi-layered device is energizable to generate a primary fluid for actuating said protection device.

8. An apparatus as set forth in claim 1 wherein said electric heating elements are reactive bridges.

9. An apparatus comprising:
   an actuatable vehicle occupant protection device;
   an array of individually energizable devices for producing one of inflation fluid and combustion products for actuating said protection device; and
   means for energizing selected ones of said array of individually energizable devices,
   said means for energizing comprising a base that extends across said array and that includes a plurality of electric heating elements associated one with each of said energizable devices,
   said means for energizing further comprising control means for directing electric current into selected ones of said plurality of electric heating elements to energize said selected ones of said energizable devices.

10. An apparatus as set forth in claim 9 wherein said heating elements are micro-resistors.

11. An apparatus as set forth in claim 9 wherein said individually energizable devices are pyrotechnic devices ignitable to produce inflation fluid under pressure.

12. An apparatus as set forth in claim 9 wherein said individually energizable devices are fluid devices energizable to produce inflation fluid under pressure.

13. An apparatus as set forth in claim 9 wherein said electric heating elements are reactive bridges.

14. An apparatus for helping to protect a vehicle occupant, comprising:
   an actuatable vehicle occupant protection device; and
   a microelectromechanical system device (MEMS device) energizable to cause actuation of said protection device,
   wherein said MEMS device includes a substrate on which is formed a plurality of electric heating elements, the electric heating elements being energizable to cause actuation of said protection device.

15. An apparatus as set forth in claim 14 wherein each of said plurality of electric heating elements has an associated pyrotechnic charge, said plurality of electric heating elements being selectively energizable, energizing of an electric heating element igniting said associated pyrotechnic charge.

16. An apparatus for helping to protect a vehicle occupant, said apparatus comprising:
   an actuatable vehicle occupant protection device; and
   a microelectromechanical system device (HEMS device) energizable to cause actuation of said protection device, said MEMS device being a multi-layered structure having abutting first and second layers, said first layer housing a plurality of energizable fluid sources and said second layer having electric circuitry for actuating said plurality of energizable fluid sources, each one of said plurality of energizable fluid sources being in contact with said electric circuitry of said second layer.

17. An apparatus as set forth in claim 16 wherein said first layer includes a block of material in which a plurality of plenums are located, each energizable fluid source of said plurality of energizable fluid sources having an associated plenum of said plurality of plenums and being housed in said associated plenum.

18. An apparatus as set forth in claim 16 further including remotely located vehicle electric circuitry that is operatively connected to said electric circuitry of said second layer controlling actuation of said plurality of energizable fluid sources.

19. An apparatus as set forth in claim 16 further including a third layer that abuts the first layer on a side opposite the second layer and that covers said plurality of energizable fluid sources, portions of said third layer being rupturable upon actuation of said plurality of energizable fluid sources.

20. An apparatus as set forth in claim 19 wherein the first, second, and third layers of the multi-layered structure are bonded together using an adhesive.

21. An apparatus for helping to protect a vehicle occupant, said apparatus comprising:
   an actuatable vehicle occupant protection device; and
   a microelectromechanical system device (MEMS device) energizable to cause actuation of said protection device, said MEMS device being a multi-layered structure including a first layer having a plurality of fluid sources and a second layer having means for actuating said plurality of fluid sources,
   said first and second layers being bonded together.

22. An apparatus as set forth in claim 21 wherein said first and second layers are bonded together using an adhesive.

23. An apparatus as set forth in claim 21 wherein said first layer includes a first surface and said second layer includes a second surface, said first and second surfaces being bonded together, said first and second surfaces having outer dimensions that are approximately equal in size.

24. An apparatus as set forth in claim 21 further including a third layer for covering said plurality of fluid sources, said third layer being bonded to said first layer on a side opposite said second layer.

25. An apparatus as set forth in claim 24 wherein said first and third layers are bonded together using an adhesive.

26. An apparatus as set forth in claim 24 wherein said first layer includes a first surface and said second layer includes a second surface, said first and second surfaces being bonded together, said first and second surfaces having outer dimensions that are approximately equal in size.

27. An apparatus as set forth in claim 21 wherein said means for actuating said plurality of fluid sources of said second layer includes an electric circuit that is operatively coupled to remotely located vehicle electric circuitry which controls actuation of said plurality of fluid sources.

28. An apparatus for helping to protect a vehicle occupant, said apparatus comprising:

an actuatable vehicle occupant protection device; and a microelectromechanical system device (MEMS device) energizable to cause actuation of said protection device, said MEMS device including a base portion, an electric circuit formed on a first surface of said base portion and terminal pins extending from said electric circuit and outwardly of a second surface of said base portion, said second surface of said base portion being opposite said first surface.

29. An apparatus as set forth in claim 28 further including an inflator housing into which said terminal pins are received for operatively coupling said electric circuit of said base portion of said MEMS device to remotely located vehicle electric circuitry, lead wires operatively connecting said vehicle electric circuitry to said terminal pins when said terminal pins are received in said inflator housing.

30. An apparatus as set forth in claim 29 wherein said MEMS device further includes a plurality of actuatable fluid sources, said vehicle electric circuitry controlling energization of said electric circuitry of said base portion of said MEMS device for actuating said plurality of actuatable fluid sources.

31. An apparatus as set forth in claim 30 wherein each of said plurality of actuatable fluid sources is individually actuatable, said vehicle electric circuitry being adapted to control which ones of said plurality of actuatable fluid sources are actuated by said electric circuit of said base portion of said MENS device.

32. An apparatus for helping to protect a vehicle occupant, the apparatus comprising:

an inflatable vehicle occupant protection device;

an inflator that includes a plurality of microelectromechanical system devices (MEMS devices), each MENS device including an array of selectively actuatable inflation fluid sources, each of the actuatable inflation fluid sources being actuatable for providing inflation fluid for inflating the inflatable vehicle occupant protection device; and vehicle electric circuitry operatively connected to the plurality of MEMS devices and configured for actuating the individual actuatable inflation fluid sources, the vehicle electric circuitry being responsive to received sensory inputs for selectively actuating the actuatable inflation fluid sources of the plurality of MEMS devices.

33. An apparatus as set forth in claim 32 wherein each actuatable inflation fluid source of the array of actuatable inflation fluid sources for each MEMS device is individually actuatable, the vehicle electric circuitry operable for selectively actuating one or more of the individually actuatable inflation fluid sources.

34. An apparatus as set forth in claim 32 wherein the inflator further includes a housing, the plurality of MEMS devices including terminal pins for mounting to the housing, the vehicle electric circuitry being operatively connected to the plurality of MEMS devices through the terminal pins.

35. An apparatus as set forth in claim 34 wherein lead wires extend between the housing and the vehicle electric circuitry for operatively connecting the plurality off MEMS devices to the vehicle electric circuitry.

36. An apparatus as set forth in claim 32 wherein each MEMS device of the plurality of MEMS devices includes a base having electric circuitry that is operatively connected to the vehicle electric circuitry, the electric circuitry of the base including means for actuating the actuatable inflation fluid sources.

37. An apparatus as set forth in claim 36 wherein the means for actuating the actuatable inflation fluid sources includes a plurality of individually energizable electric heating elements, each one of the actuatable inflation fluid sources having an associated one of the plurality of individually energizable electric heating elements.

38. An apparatus as set forth in claim 32 wherein each of the MEMS devices has a length of approximately one half of an inch and a width of approximately one half of an inch.

39. An apparatus as set forth in claim 32 wherein each of the MEMS devices includes a plurality of plenums, each one of the plurality of plenums storing an associated one of the actuatable inflation fluid sources, each one of the plurality of plenums having a depth of up to ten millimeters.

40. An apparatus as set forth in claim 39 wherein each of the plurality of plenums is cylindrical and has a diameter of up to 1.4 millimeters.

* * * * *

UNITED STATES PATENT AND TRADEMARK OFFICE
CERTIFICATE OF CORRECTION

PATENT NO. : 6,983,955 B2  Page 1 of 1
APPLICATION NO. : 09/755704
DATED : January 10, 2006
INVENTOR(S) : Lee D. Bergerson et al.

It is certified that error appears in the above-identified patent and that said Letters Patent is hereby corrected as shown below:

Column 12,
Line 20, change "HEMS" to -- MEMS --.

Column 13,
Lines 44 and 49, change "MENS" to -- MEMS --.

Column 14,
Line 25, after "plurality" delete "off" and insert -- of --.

Signed and Sealed this

Twentieth Day of June, 2006

JON W. DUDAS
*Director of the United States Patent and Trademark Office*